US006063434A

United States Patent [19]

Rho et al.

[11] Patent Number: 6,063,434

[45] Date of Patent: *May 16, 2000

[54] PASTE COMPOSITION FOR SCREEN PRINTING OF CRT SHADOW MASK AND SCREEN PRINTING METHOD USING THE SAME

[75] Inventors: Hwan-chul Rho, Kunpo; Dong-hee Han; Jae-myung Kim, both of Suwon, all of Rep. of Korea

[73] Assignee: SamSung Display Devices Co., Ltd., Kyungki-Do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/930,559

[22] PCT Filed: Feb. 12, 1997

[86] PCT No.: PCT/KR97/00027

§ 371 Date: Oct. 2, 1997

§ 102(e) Date: Oct. 2, 1997

[87] PCT Pub. No.: WO97/29504

PCT Pub. Date: Aug. 14, 1997

[30] Foreign Application Priority Data

| | | | |
|---|---|---|---|
| Feb. 12, 1996 | [KR] | Rep. of Korea | 96/3360 |
| Jan. 23, 1997 | [KR] | Rep. of Korea | 97/1934 |
| Jan. 23, 1997 | [KR] | Rep. of Korea | 97/1935 |

[51] Int. Cl.$^7$ ........ B05D 1/32; C09K 3/00

[52] U.S. Cl. ........ 427/68; 427/282; 427/356; 106/287.19

[58] Field of Search ........ 427/68, 282, 356; 106/287.18, 287.19, 287.17, 198.1; 101/129; 524/560, 561, 590; 523/400; 527/300; 501/65–67, 77

[56] References Cited

U.S. PATENT DOCUMENTS

| | | | |
|---|---|---|---|
| 3,562,518 | 2/1971 | Javorik et al. | 313/85 |
| 4,420,366 | 12/1983 | Oka et al. | 156/644 |
| 4,442,376 | 4/1984 | Van der Waal et al. | 313/402 |
| 4,493,789 | 1/1985 | Ueyama et al. | 252/514 |
| 4,665,338 | 5/1987 | Inaba et al. | 313/402 |
| 4,799,958 | 1/1989 | Morris et al. | 106/1.12 |
| 5,433,974 | 7/1995 | Lee | 427/252 |

*Primary Examiner*—Fred J. Parker
*Attorney, Agent, or Firm*—Leydig, Voit & Mayer

[57] ABSTRACT

A paste composition for screen printing a cathode ray tube (CRT) shadow mask, the composition including 12–32 wt % of a vehicle, 34–87 wt % of an electron reflecting material, and 0.7–44 wt % of a frit, and a screen printing method using the paste composition. A CRT shadow mask to which the paste composition has been applied, the vehicle driven off, and the frit glassified exhibits decreased doming due to reduced thermal expansion of the shadow mask.

8 Claims, 2 Drawing Sheets

PASTE COMPOSITION FOR SCREEN PRINTING OF CRT SHADOW MASK AND SCREEN PRINTING METHOD USING THE SAME

TECHNICAL FIELD

The present invention relates to a paste composition for screen printing a cathode ray tube (CRT) shadow mask and a screen printing method using the same, and more particularly, to a paste composition for screen printing a CRT shadow mask, which coats the surface of the shadow mask to suppress a doming phenomenon, and a screen printing method using the same.

BACKGROUND OF THE INVENTION

Generally, as shown in FIG. 1, a CRT includes a panel 10 having a fluorescent layer 2 on the inner side thereof, a shadow mask frame assembly 4 fixed to the inner side of the panel 10, being separated from the fluorescent layer 2 by a predetermined distance, an electron gun 7 and a deflection yoke 5, installed at a neck portion 6 and a cone portion 8, respectively. Here, the shadow mask frame assembly 4 installed in the panel 10, as shown in FIG. 2, includes a shadow mask 3 having a hole portion 3*a* with a plurality of electron beam passing holes H and a concave skirt portion 3*b* extending from the edge of the hole portion 3*a*, and a frame 9 coupled with the skirt portion 3*b* for supporting the shadow mask 3. Also, the shadow mask frame assembly 4 is coupled with a spring (not shown) fixed on the side of the frame 9 and a stud pin (not shown) fixed on the inner side of the panel, thereby separating the shadow mask 3 from the fluorescent layer 2 by a predetermined distance.

According to the CRT having the above structure, after the electron beam emitted from the electron gun 7 is selectively deflected by the deflection yoke 5 according to the scanning position of the electron beam on the fluorescent layer 2, the electron beam passes through the electron beam passing holes H of the shadow mask 3 supported by the frame 9 and reaches the fluorescent layer, thereby forming an image. Here, only 15~30% of the electrons pass through the electron beam passing holes H of the shadow mask. The remaining electrons which could not pass through the electron beam passing holes H collide with the hole portion 3*a* of the shadow mask 3, so that the shadow mask 3 and the frame 9 supporting the shadow mask 3 are heated, which causes a doming phenomenon of the shadow mask 3.

Due to the doming phenomenon of the shadow mask 3, the location of the electron beam passing holes H in the hole portion 3*a* of the shadow mask 3 is changed, so that the electron beam emitted from the electron gun 7 is not correctly incident on a fluorescent point of the florescent layer 2.

To solve this problem, according to a conventional method, the interval between the fluorescent layer 2 and the shadow mask 3 is controlled by moving the shadow mask 3.

However, by such a method, the doming phenomenon is suppressed only when the shadow mask 3 is completely domed through a thermal expansion thereof. Thus, decreased resolution due to an initial doming phenomenon cannot be prevented.

In order to prevent the doming phenomenon, a shadow mask made of invar (invariable steel) is disclosed in U.S. Pat. Nos. 4,665,338 and 4,420,366. The conventional shadow mask made of invar can resist the thermal expansion. However, the use of invar has disadvantages in cost and processing.

As another method for reducing the thermal expansion ratio of the shadow mask, depositing a material having a low thermal expansion ratio, such as lead borate, on the surface of the shadow mask is known.

As still another method for preventing the doming phenomenon, depositing an insulating material on the surface of the shadow mask is widely known. This method prevents the transfer of heat generated by the electron beam to the shadow mask, wherein ceramic is mainly used as the insulating material.

As still yet another method, a material having a high thermal radiating coefficient is applied to the surface of the shadow mask or the shadow mask is darkened, to increase the thermal radiating ratio. Also, depositing an aqueous suspension including an electron reflection material on the surface of the shadow mask has been disclosed by Phillips.

Generally, the thermal insulating material, thermal radiating material, electron reflecting material, etc. are applied to the surface of the shadow mask by a spray method or a sputtering method. According to the spray method, where an aqueous suspension is sprayed on the mask surface via a nozzle, some of the holes formed on the shadow mask become clogged even if the spray process is precisely controlled, and the mask surface coating produced by this method is not even.

On the other hand, according to the sputtering method, wherein gas ions generated during a glow discharge collide with a target cathode and then the atoms emitted from the target coat to the substrate of an anode, the coated layer is thin and expensive deposition equipment is required.

In order to solve the defects of the above described coating methods, a new coating method using screen printing is disclosed.

SUMMARY OF THE INVENTION

To solve the above problems, it is an object of the present invention to provide a paste composition for screen printing a CRT shadow mask, which can suppress doming of the shadow mask.

It is another object of the present invention to provide a screen printing method using the above paste composition.

To achieve the first object, there is provided a paste composition for screen printing a CRT shadow mask which comprises 12~32 wt % of a vehicle, 34~87 wt % of an electron reflecting material and 0.7~44 wt % of a frit.

As the electron reflecting material, bismuth (Bi), tungsten (W), lead (Pb) or the oxides thereof may be used.

The doming phenomenon can be decreased by a thermal radiating effect, as well. For example, materials having a high thermal radiating coefficient are added to the above composition. Here, as materials having a high thermal radiating coefficient, carbon, manganese, manganese oxide, aluminum oxide, dark pigment, etc. are used.

Also, preferably, content of the thermal radiating material is 5~30 wt % based on the electron reflecting material.

To achieve the second object, there is provided a screen printing method using a paste composition for screen printing of a CRT shadow mask comprising the steps of:

(a) uniformly depositing a paste composition comprising 12~32 wt % of a vehicle, 34~87 wt % of an electron reflecting material and 0.7~44 wt % of a frit on a screen mesh on which a reverse pattern with respect to a shadow mask pattern has been formed; and (b) putting the shadow mask on a printing substrate and pressing the screen mesh using a squeezer to spread the paste composition, thereby printing the shadow mask.

DETAILED DESCRIPTION

A printing composition of the present invention a includes vehicle, an electron reflecting material, and a frit.

The vehicle is for controlling the viscosity and concentration of the composition for smooth printing and enables a press process for curving a shadow mask after a drying process. Here, a solvent is volatilized in the drying process after the printing process and the vehicle itself completely disappears in a darkening process.

The vehicle can include a mixture comprising a tackifier, a binding agent, a solvent, etc. For example, the vehicle can include an oil paste, terpineol as a tackifier, ethyl cellulose as a binding agent and butyl carbitol.

The tackifier is for increasing the adhesion between each film, and terpineol, silicones, and mineral oil can be used as the tackifier.

The binding agent includes a heat-curable resin such as ethyl cellulose, acrylic resin, epoxy resin, urethane resin, and an ultraviolet-curable resin. Particularly, it is preferable to use an ultraviolet-curable resin, cured by absorbing ultraviolet rays having a wavelength of 230~400 nm, as the binding agent. When an ultraviolet-curable resin is used as the binding agent, a solvent drying process can be omitted unlike a heat-cured resin. Thus, the manufacturing process can be simplified and problems caused from the volatilization of solvent are minimized.

The solvent can include an organic solvent such as butyl carbitol, acetate, ethyl carbitol, animal oil, and vegetable oil.

As the electron reflecting material of the present invention, heavy metal atoms having an atomic number greater than 70 and oxides thereof can be used, and preferably, bismuth (Bi), tungsten (W), lead (Pb) and the oxides thereof can be used.

As the frit for promoting the firm adhesion of various materials to the surface of the shadow mask while being glassified in a darkening process performed at 500~600° C., a material selected from the group consisting of titanium oxide, zirconium oxide, alumina, lead oxide, boron oxide and silicon oxide are used. These materials are completely glassified (i.e., converted to glass phase) at a predetermined temperature after the completion of the printing, thereby assisting the adhesion of the materials.

According to the present invention, an insulation effect can be achieved by forming an insulation layer on the surface of the shadow mask using the printing composition including only the vehicle and frit.

A screen printing method of the present invention will now be described with reference to FIG. 3.

Figure 1:
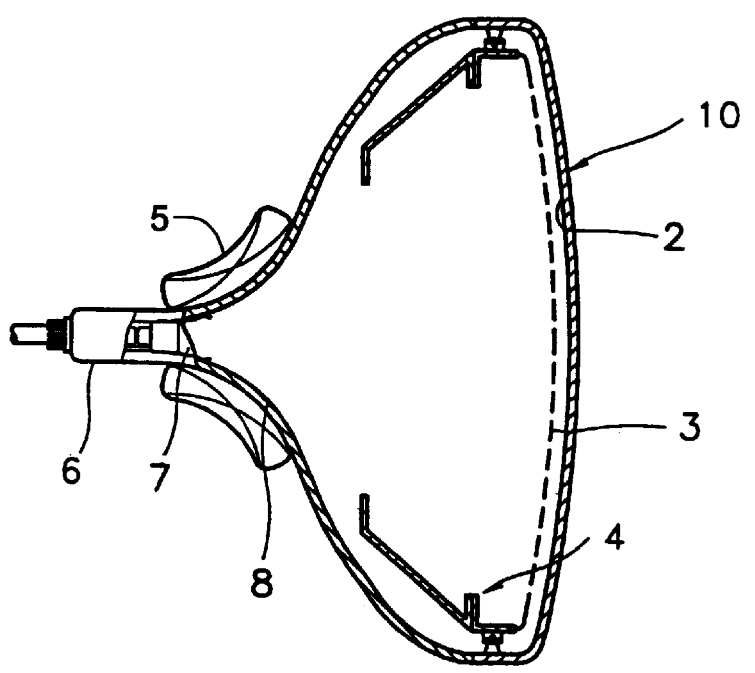
FIG. 1 is a cross-sectional diagram of a general cathode ray tube.
Figure 2:
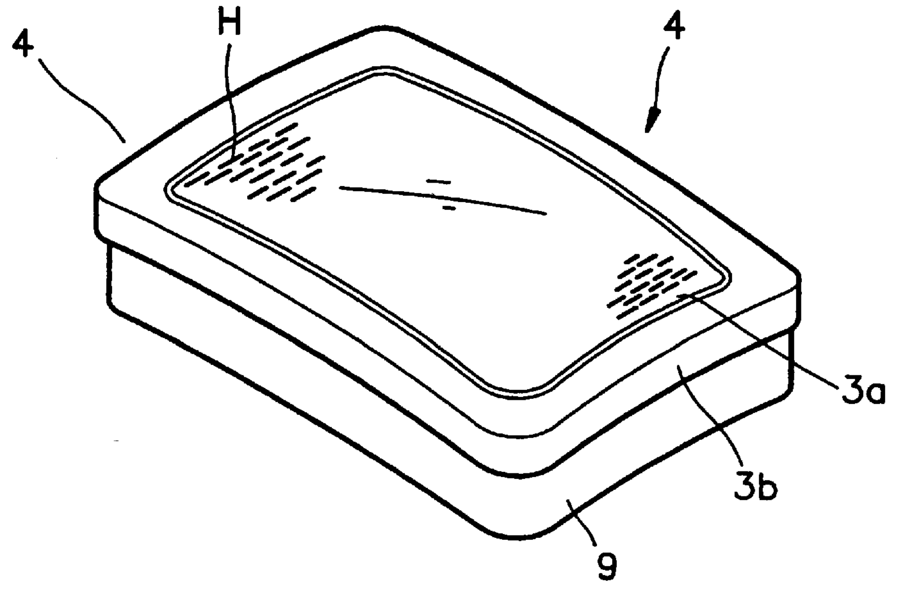
FIG. 2 is a perspective view of a general shadow mask frame assembly.
Figure 3:
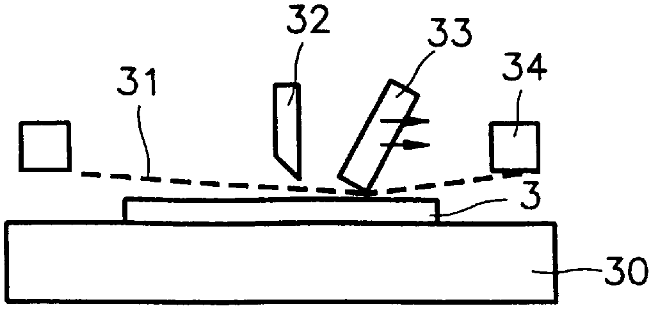
FIG. 3 is a diagram illustrating a screen printing method according to the present invention.
Figure 4:
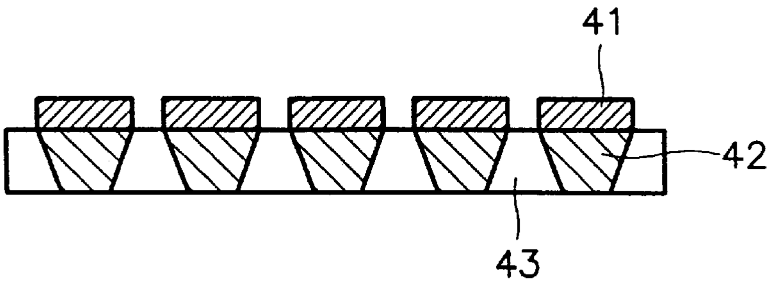
FIG. 4 is a sectional view of a shadow mask from a side to which an electron gun is attached.

As shown in FIG. 3, a paste of the printing composition is uniformly deposited on a screen mesh 31, firmly fixed to a rectangular frame 34, using a scraper 32. Here, the shape of the shadow mask to be screen printed should be present in the screen mesh 31. A printing or coating process will be described with reference to FIG. 4. Here, the shadow mask shown in FIG. 4 has a plurality of electron beam passing holes 43 for passing the electron beam and a plurality of no-hole portions 42 located between the electron beam passing holes 43. Also, a plurality of portion of a coating layer 41 having a predetermined thickness are formed at one surface of the shadow mask on which the electron beam is incident.

The screen mesh made of, for example, stainless steel, polyester or nylon is attached to the frame, and a photoresist is coated on the entire surface of the screen mesh, and then dried. Also, after interposing a shadow mask on the above resultant structure, exposing, etching and drying processes are performed to form the photoresist 41 at portions corresponding to the electron beam passing holes 43 of the shadow mask. Here, the formed photoresist has a reverse phase with respect to a hole pattern of the shadow mask.

Thereafter, an object to be printed, that is, a shadow mask 3, is put on a printing substrate 30, and the screen mesh 31 is then evenly pressed using a squeegee 33 to spread the paste, thereby printing the layer 41 on the no-hole portion 42 of the shadow mask. Here, the intended shape of the shadow mask should be formed on the screen mesh 31.

After the printing is completed according to the above method, the organic solvent included in the paste is completely volatilized through a drying process. Thereafter, a forming process for providing a proper curvature to the shadow mask 3 and a darkening process for darkening the surface of the shadow mask 3 are performed according to a general CRT manufacturing process. Particularly, during the darkening process, the frit of the printing composition is glassified to form a glass phase to adhere the paste to the shadow mask and the organic materials, such as binding agent (resins), remaining after the drying process are completely removed. Here, the conversion of the frit into the glass phase is preferably performed in the temperature range of 250~600° C. Here, the resultant material obtained after the darkening process includes 44~99.3 wt % of electron reflecting material, 0.7~57 wt % of frit and 0~10 wt % of inorganic material.

In the CRT manufacturing process, the darkening process may be performed prior to the forming process. On a other hand, if the forming process is performed after the darkening process, the following process, such as a washing process, can easily be performed, but the adhesive force of the paste is not maintained. However, this defect can be overcome by controlling the content of the frit.

Hereinafter, the preferred examples of the present invention will be described in detail, however, the present invention is not limited to the following examples.

EXAMPLE 1

23 wt % of a mixture of terpineol, ethyl cellulose, ethyl carbitol and butyl carbitol, 15.4 wt % of frit composed of titanium dioxide, silicon dioxide, lead oxide and zirconium dioxide, and 61.6 wt % of a mixture of bismuth and an oxide thereof were fully mixed to prepare a paste, and then the paste was deposited on a screen mesh.

After putting a shadow mask on a printing substrate, the mesh was evenly pressed using a squeegee to spread the paste, thereby printing the shadow mask.

Then, drying, forming and darkening processes were sequentially performed. Here, the temperature during the conversion of the frit to a glass phase was about 560° C.

EXAMPLE 2

A paste was prepared using the same composition as that of Example 1, except that tungsten, tungsten carbide and tungsten oxide were used instead of bismuth and the oxide thereof.

Then, the printing, drying, forming and darkening processes were performed in the same manner as described in Example 1.

EXAMPLE 3

A paste was prepared using the same composition as that of Example 1, except that an acrylic resin was used instead of ethyl cellulose.

Then, the printing, drying, forming and darkening processes were performed in the same manner as described in Example 1.

EXAMPLE 4

A paste was prepared using the same composition as that of Example 1, except that an epoxy resin was used instead of ethyl cellulose.

Then, the printing, drying, forming and darkening processes were performed in the same manner as described in Example 1.

EXAMPLE 5

A paste was prepared using the same composition as that of Example 1, except that an ultraviolet-curable epoxy resin was used instead of ethyl cellulose, and the shadow mask was printed according to the same method described in Example 1. Then, the printed shadow mask was cured by irradiating about 2 kw of ultraviolet rays having a wavelength of 230~400 nm for 5 minutes.

Then, the printing, drying, forming and darkening processes were performed in the same manner as described in Example 1.

EXAMPLE 6

A paste was prepared using the same composition as that of Example 1, except that an ultraviolet-curable urethane resin was used instead of ethyl cellulose.

Then, the printing, drying, forming and darkening processes were performed in the same manner as described in Example 1.

COMPARATIVE EXAMPLE 1

According to a general method, no treatment was performed on the surface of the shadow mask.

Figure 5:
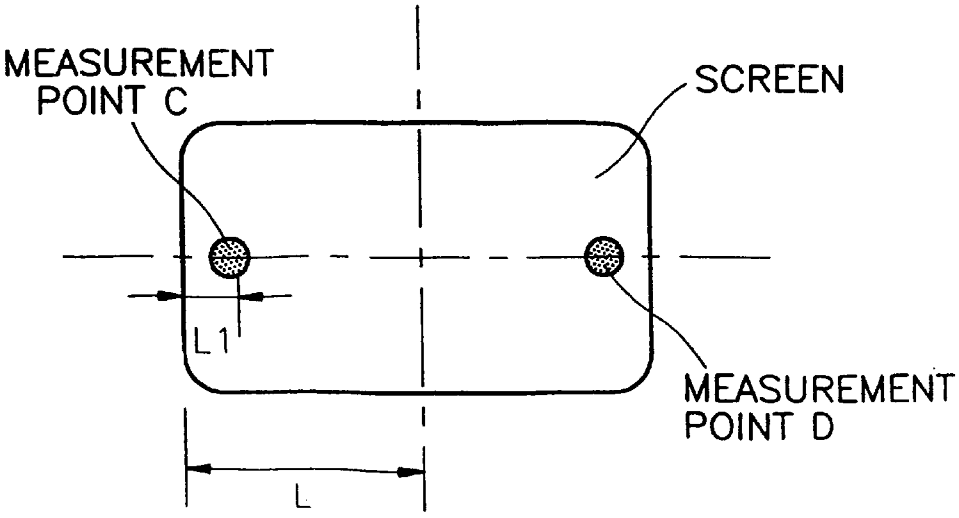
FIG. 5 is a diagram showing points for measuring the shift of the shadow mask when the CRT shadow mask is printed using the compositions prepared according to the preferred embodiments and a comparative example.

When the surface of the shadow mask of AK steel was coated with the compositions prepared in examples 1 and 2, the shifting of each shadow mask was shown in Table 1. Here, the shifting of the shadow mask was measured at the points C ($L_1$=L/3) and D of FIG. 5.

As can be seen from Table 1, the shifting of the shadow mask coated with the compositions prepared in examples 1 and 2 was decreased by about 24~31% compared with that of the comparative example wherein no treatment was performed on the surface of the shadow mask.

Also, the shifting of each shadow mask coated with the compositions prepared in Examples 3, 4, 5 and 6 was the same as that of Example 1.

TABLE 1

| | $A^1$(μm) | $B^2$(μm) | average landing shift (μm) | decreased landing shift$^3$ (%) |
|---|---|---|---|---|
| Example 1 | 43 | 47 | 46.25 | 23.9 |
| | 48 | 47 | | |
| Example 2 | 43 | 42 | 42.25 | 30.5 |
| | 44 | 40 | | |
| Comparative example | 60 | 61 | 60.75 | |
| | 62 | 60 | | |

$A^1$: landing shift of the shadow mask measured at the point C
$B^2$: landing shift of the shadow mask measured at point D
Decreased landing shift$^3$: decreased landing shift of the shadow mask calculated on the basis of the average landing shift of the comparative example According to the present invention, electron reflecting materials and thermal radiating materials coated the surface of the CRT shadow mask to decrease doming due to the thermal expansion of the shadow mask, thereby preventing deterioration of image quality caused by the doming phenomenon.

What is claimed is:

1. A paste composition for screen printing a cathode ray tube (CRT) shadow mask comprising about 12 to about 32 wt % of a vehicle, about 34 to about 87 wt % of an electron reflecting material, and about 0.7 to about 44 wt % of a frit, said frit having a glassification temperature within a range of 250–600° C. and being selected from the group consisting of:

a. one of titanium dioxide, zirconium dioxide, and boron oxide; and b. a mixture of titanium dioxide and at least one of zirconium dioxide, silicon dioxide, lead oxide, and boron oxide.

2. The paste composition for screen printing a CRT shadow mask as claimed in claim 1, wherein the vehicle comprises at least one material selected from the group consisting of ethyl cellulose, acryl resin, epoxy resin, urethane resin, and ultraviolet-curable resin.

3. The paste composition for screen printing a CRT shadow mask as claimed in claim 1, wherein said electron reflecting material comprises at least one material selected from the group consisting of bismuth, bismuth oxide, tungsten oxide, lead, and lead oxide.

4. A method for screen printing a cathode ray tube (CRT) shadow mask comprising:

depositing a layer of a paste composition comprising about 12 to about 32 wt % of a vehicle, about 34 to about 87 wt % of an electron reflecting material, and about 0.7 to about 44 wt % of a frit on a screen mesh having a pattern reverse to a shadow mask pattern, the frit having a glassification temperature within a range of 250–600° C. and selected from the group consisting of:

a. one of titanium dioxide, zirconium dioxide, and boron oxide; and b. a mixture of titanium dioxide and at least one of zirconium dioxide, silicon dioxide, lead oxide, and boron oxide;

supporting the shadow mask, with the screen mesh between the shadow mask and the paste composition, and pressing the paste composition on the screen mesh using a squeegee to spread the paste composition and screen print the paste composition on the shadow mask;

volatilizing and removing the vehicle from the paste on the shadow mask; and heating the shadow mask to a temperature in a range from 250° C. to 600° C., thereby glassifying the frit and adhering the electron reflecting material to the shadow mask.

5. The method as claimed in claim 4, wherein the vehicle comprises at least one selected from the group consisting of ethyl cellulose, acryl resin, epoxy resin, urethane resin, and ultraviolet-curable resin.

6. The method as claimed in claim 4, wherein the electron reflecting material comprises at least one material selected from the group consisting of bismuth, bismuth oxide, tungsten oxide, lead, and lead oxide.

7. The method as claimed in claim 4, including bending the shadow mask to a desired curvature before glassifying the frit.

8. The method as claimed in claim 4, including bending the shadow mask to a desired curvature after glassifying the frit.

* * * * *